United States Patent
Forsman

(10) Patent No.: US 10,539,263 B2
(45) Date of Patent: Jan. 21, 2020

(54) CURED-IN-PLACE PIPE LINER

(71) Applicant: Tomas Forsman, Porvoo (FI)

(72) Inventor: Tomas Forsman, Porvoo (FI)

( * ) Notice: Subject to any disclaimer, the term of this patent is extended or adjusted under 35 U.S.C. 154(b) by 380 days.

(21) Appl. No.: 15/307,399

(22) PCT Filed: Apr. 30, 2015

(86) PCT No.: PCT/FI2015/000018
§ 371 (c)(1),
(2) Date: Oct. 28, 2016

(87) PCT Pub. No.: WO2015/166133
PCT Pub. Date: Nov. 5, 2015

(65) Prior Publication Data
US 2017/0051863 A1    Feb. 23, 2017

(30) Foreign Application Priority Data
Apr. 30, 2014 (FI) ..................... 20140123

(51) Int. Cl.
| | |
|---|---|
| *F16L 55/165* | (2006.01) |
| *B32B 5/06* | (2006.01) |
| *B32B 37/12* | (2006.01) |
| *D04H 1/488* | (2012.01) |

(52) U.S. Cl.
CPC ............. *F16L 55/165* (2013.01); *B32B 5/06* (2013.01); *B32B 37/12* (2013.01); *D04H 1/488* (2013.01); *B32B 2597/00* (2013.01); *D10B 2505/00* (2013.01)

(58) Field of Classification Search
CPC .......... F16L 55/165; B32B 5/06; D04H 1/488
See application file for complete search history.

(56) References Cited

U.S. PATENT DOCUMENTS

| | | |
|---|---|---|
| 6,170,531 B1 | 1/2001 | Jung et al. |
| 6,296,729 B1 | 10/2001 | Kamiyama et al. |
| 2008/0277013 A1 | 11/2008 | Anders et al. |

FOREIGN PATENT DOCUMENTS

| | | |
|---|---|---|
| FI | 92570 | 8/1994 |
| WO | WO 0028257 A1 | 5/2000 |

*Primary Examiner* — Jeffry H Aftergut
*Assistant Examiner* — Jaeyun Lee
(74) *Attorney, Agent, or Firm* — Bay State IP, LLC

(57) ABSTRACT

A CIPP liner for repairing a sewer pipe comprises a cover fabric (1) and a base fabric (2) to be attached to each other using needle punch technology, as well as a stretchable plastic membrane (4) attached to the base fabric (2) with a flexible glue (3), into which flexible glue (3) also the with each other mixed fibres (5) of the cover fabric (1) and the base fabric (2) are glued. From this material, a CIPP liner corresponding to the dimensions of the sewer pipe is cut and sewn, the sewing seam of which is further taped.

4 Claims, 1 Drawing Sheet

CURED-IN-PLACE PIPE LINER

Figure 1:
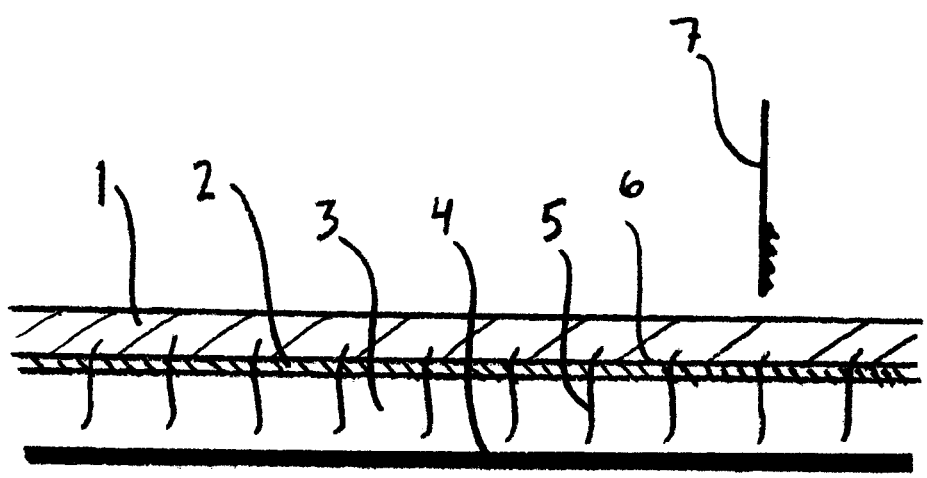

This invention relates to a cured-in-place pipe liner and a method for its production. A cured-in-place pipe liner (CIPP liner) belongs to the field of textile technology and is intended as an instrument for sliplining a sewer pipe. Therefore, a CIPP liner is used in the repairing of sewer pipes.

In the solutions of prior known art, the fabric layer belonging to the structure of the liner is glued onto the plastic membrane. In sewer renovation performed using the sliplining method, the inside of the liner structure, which has a fabric surface and is hardened with epoxy, goes against the inside surface of the sewer pipe and the plastic membrane surface of the liner structure remains as the innermost surface. The fabric types used in known solutions are a brushed fabric, i.e. a so-called molton fabric type, and felt fabrics. In a brushed fabric, the thicker fabric is brushed in order that the epoxy would be better absorbed therein. The brushed fabric is made from a tensile fabric, but it can be stretched at the most approximately only 50 percent of the length or the width of the fabric. For this reason, a liner from this that is cut to a given dimension and sewn is only suitable for a pipe size corresponding to this or the next standard dimension. A felt fabric is also the same type as the brushed fabric, but it is not very often stretchable. For this reason, it is suitable for only one pipe size. The fabric qualities used in known solutions are also not to be uniformly thickened. Variable size liners with polyurethane surfaces cannot withstand temperatures above 80 degrees Celsius and are brittle and easily damaged in the heat.

The object of the invention is to produce a CIPP liner, in which the above said disadvantages are removed and to provide a CIPP liner to be adequately stretched. To assure a good sliplining, the diameter of the CIPP liner must be smaller than the diameter of the pipe to be renovated and, at the same time, the CIPP liner must be capable of being expanded by stretching it to correspond to the diameter of more than one pipe size. The CIPP liner is then required to stretch to a minimum of 60-70 percent of its original size, which assures the use of the same liner for more than one diameter of pipe. The elongation percentage and the elongation direction must be defined on the basis of the base fabric. The elongation properties of cover fabrics must be similar in all directions. There are different base fabrics and these have different elongation directions, both longitudinal and transverse. Further, the thickness of the fabric must be uniformly adjustable. One plastic membrane used in the invention and tensile in both directions is thermo polyurethane (TPU), which withstands heating over 100 degrees Celsius. Epoxy polymers generally require post-heating to achieve a high $T_g$-value. A normal polyurethane-surfaced liner cannot withstand adequately high post-heating temperatures. Other types of plastic used in the invention are PU, PVC. Other suitable plastics can also be used.

The fact that one liner size is suitable for more than one pipe size improves economic viability due to the simpler production technique, as all the different sizes of liner do not need separate production lines. Due to the invention, they can be decreased by half. Using the same renovation technology, the needs of several customers can be met. The final result of a stretched CIPP liner remains of more even quality and at the desired dimension, when the liner is stretched in only one direction.

According to the invention, an uniformly thick CIPP liner to be adequately stretched can be produced using a method, in which as the base fabric of the CIPP liner is used a fabric that is thinner than the cover fabric defining the longitudinal and transverse elongation maximums, and in which as the cover fabric of the CIPP liner is used a more tensile fabric that is thicker than the base fabric and suitable for binding with the epoxy. The elongation maximum of one base fabric in the longitudinal direction is approximately 10 percent and in the transverse direction approximately 70 percent. The elongation maximum of another base fabric in the longitudinal direction is approximately 30 percent and in the transverse direction approximately 50 percent. In a thicker cover fabric, the elongation maximums in both the longitudinal and transverse direction are approximately 70-80 percent. These fabrics are in relation to the elongation directions to be exchanged according to the invention into a different position in relation to each other. The position of the base fabric defines its elongation direction. The thickness of the cover fabric is variable according to requirements of different standards. The cover fabric is preferably approx. 2.5-4.5 millimetres thick and approx. 250-550 grams in mass per square metre. One cover fabric solution is to use a cover fabric that is arranged in waves and/or pleats, with which the tensility of the CIPP liner in the desired direction is assured by the direction of the waves and/or pleats. According to one embodiment, the fabric used is arranged in waves or pleats in both the longitudinal and transverse directions, with which is arranged even better tensility of the CIPP liner in both or only in one direction. The waviness and/or the pleating is created by stretching the base fabric in the desired direction/directions during production of the CIPP liner before attaching the fabrics to each other using needle punch technology. By binding the base and cover fabrics to the plastic membrane with glue, the desired final result is achieved, as is explained in the following. The base fabric is preferably approx. 100-200 grams in mass. The cover fabric is teased and attached to the base fabric with needle punch needles, in which the serrated design on the side of the needle punch needle against the pressing direction presses the fibres of the cover fabric into the structure of the base fabric, thus mixing the fibres of the different fabrics with each other and thus binding the fabrics together and forming a so-called elastic layer. This manner of attaching the fabrics creates the elongation property. After this, the plastic membrane is glued to the base fabric as the flexible glue extends into the fabric structure such that the mixed fibres of different fabrics become glued onto each other as well as to the plastic membrane. The structure thus created, formed by two fabrics, glue and plastic, is sewn to make a CIPP liner, the sewing seams of which CIPP liner are finally taped to prevent the epoxy from leaking.

More specifically, a method and device according to the invention is characterized by that what is presented in the characterizing parts of claims 1 and 2.

In the following, the invention is described in more detail with reference to the accompanying drawings, in which FIG. 1 shows a cross-section of the fabric structure of a CIPP liner according to the invention.

The cover fabric 1 is teased and placed against the base fabric 2, after which, from the side of the cover fabric 1, the needle punch needles 7 are pressed through the cover fabric 1 and the base fabric 2, wherein the fibres of both fabrics 1 and 2 mix with each other and the mixed fibres 5 extend to the outside of the surface of the base fabric 2. The needle punch needles 7 are removed. The base fabric 2 is glued with flexible glue 3 to the plastic membrane 4, at the same time gluing the mixed fibres 5 to each other. Thus, an elastic layer 6 between the base fabric 1 and the cover fabric 2 is formed. When the glue 3 has dried, from the CIPP liner fabric created, a piece of the requisite size is cut and sewn into the shape of a CIPP liner and the sewing seams are taped.

There are many alternative implementations for the invention, for example, the use of two cover fabrics instead of one in the CIPP liner.

The invention claimed is:

1. A method for producing a CIPP liner, comprising the steps of:
   stretching a base fabric (2) in one or more directions;
   arranging an evenly spread cover fabric (1) against the base fabric (2) stretched in one or more directions;
   pressing needle punch needles (7) from the side of the cover fabric (1) through the cover fabric (1) and the base fabric (2), thereby mixing the fibres of the fabrics (1) and (2) with each other and the mixed fibres (5) extend to the outside of the surface of the base fabric (2);
   removing the needle punch needles (7);
   attaching the base fabric (2) and a plastic membrane (4) to each other with a flexible glue (3), wherein, at the same time, the mixed fibres (5) are attached by the glue (3) to each other thereby producing the cover fabric (1) arranged in both longitudinal and transverse directions in waves and/or pleats attached to the base fabric (2); and
   cutting and sewing a piece of the requisite size of the CIPP liner from the created CIPP liner fabric, and taping the sewing seams once the glue (3) has dried.

2. The method according to claim 1 further comprising the step of:
   cutting the CIPP liner according to the diameter of the sewer pipe, to provide a flexible CIPP liner, wherein the cover fabric (1) and the base fabric (2) are made of different materials and having different maximum lengths of elongation and wherein the plastic membrane (4) is a stretchable plastic membrane (4).

3. The method according to claim 2, wherein as the cover fabric (1) is stretchable so that it is in its stretched state it is 70-80 percent larger than in its non-stretched state.

4. The method according to claim 2, wherein as the base fabric (2) is has different elongation properties in relation to the longitudinal and transverse directions.

* * * * *